3,463,592
SHIFTING BEAM MICROSPECTROPHOTOMETER WITH MEANS FOR SELECTIVELY VARYING PATHS OF REFERENCE AND SAMPLE BEAMS THROUGH A COMMON OPTICAL SYSTEM
Karl Aron Lennart Akerman, Ullangergatan 5, Vallingby, Sweden
Filed May 4, 1964, Ser. No. 364,706
Int. Cl. G01j 3/42
U.S. Cl. 356—95                     18 Claims

ABSTRACT OF THE DISCLOSURE

A shifting beam spectrophotometer using the same optical elements for directing a beam of light from a single source so that it alternately passes through the sample and reference. An oscillating mirror rapidly and alternately directs the beam through the reference and sample, the deviation between the two paths being quite small so that a visual impression of two continuously illuminated areas is obtained in the object plane of the microscope. Means are provided for varying the magnitude of oscillation and the plane of oscillation so that the positions of the illuminated areas may be varied. The sample and reference beams are imaged at the same spot on the cathode of a photomultiplier. The photo anode current is held constant so that the dynode voltage varies as a function of the luminous intensity variations on the cathode. The dynode voltage is applied to a logarithmic converter and, after the DC is removed, the voltage variations are rectified and applied to an indicator.

---

Figure 1:
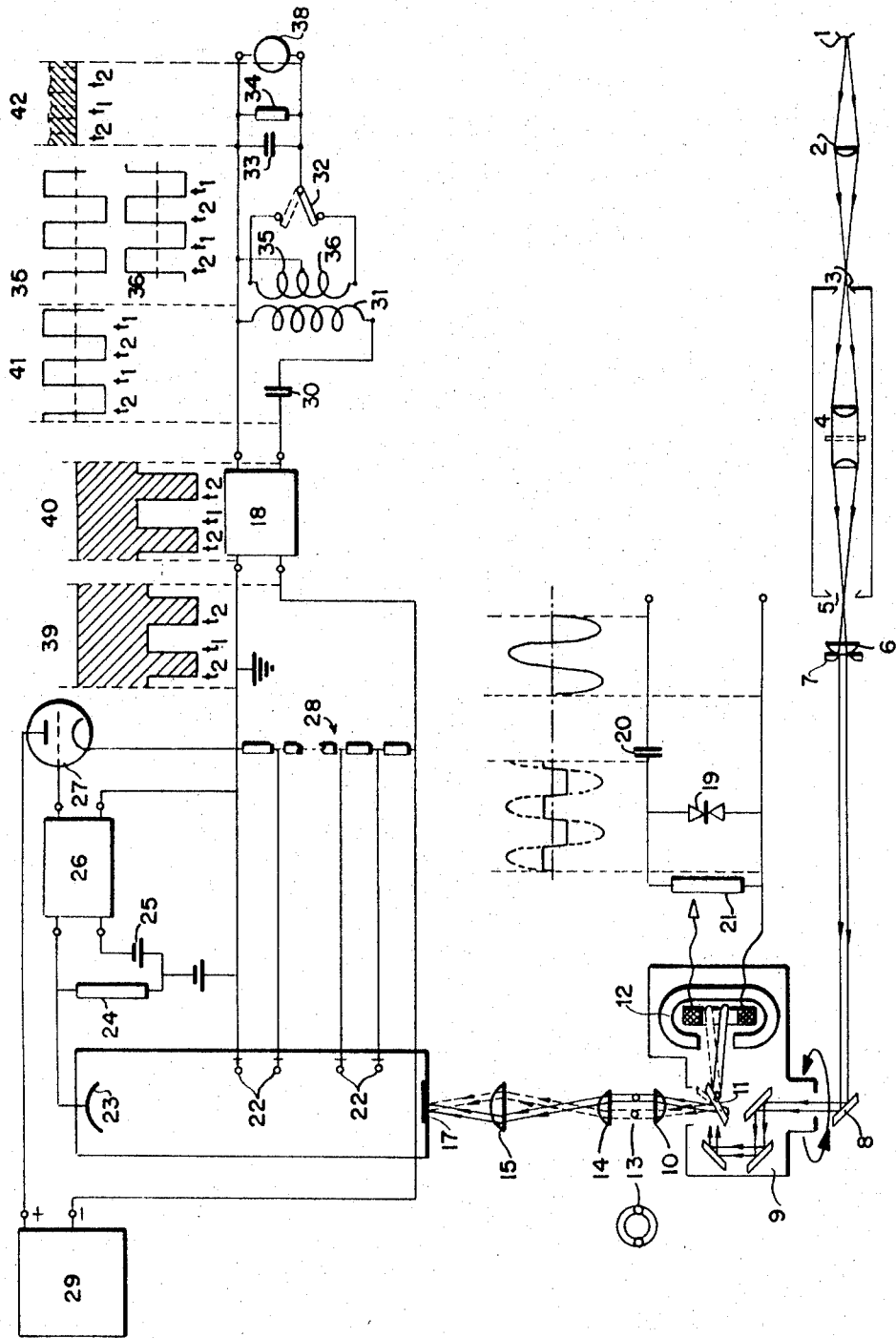

Studies of the dynamic behaviour of the individual biological cell have aroused an ever increasing interest in cytochemistry and cytology. In such research work it has proved to be particularly advantageous to apply and use methods of optical analysis, such as, for example, changes of luminous absorption or fluoroescence effects in relation to a controllable functional parameter of the cell.

Since part of the cell's chemical substances initiating and controling its growth, metabolism and function are to be found in extremely low concentrations, it is a necessity when developing instruments of analysis to eliminate technical sources of errors to such an extent as is possible in practice with regard to optimal efficiency.

The spectrophotometer according to the present invention has been developed to analyse the individual cell's contents of substances having light absorbing characteristics within the visible and the ultraviolet frequency range.

Luminous absorption analysis is in principle carried out by measuring the relative weakening that the light intensity undergoes when passing through the object or sample to be measured. If $L_o$ denotes the intensity when entering and $L$ the intensity when leaving the object, the transmission will be $$T = L/L_o = 10^{-kcd}$$

where $k$ is a constant specific for the material or the extinction coefficient, $d$ the luminous path length through the object and $c$ the concentration of the analysed substance. By translating the equation into logarithms we get $$-\log \frac{L}{L_o} = kcd = E$$

where E is the absorbance of the sample and is, as will be seen, a linear function of the concentration. The absorbance E is thus a more readily useable quantity than the transmission T.

In present day absorption systems it is common practice to provide separate reference and sample beam paths from a single radiation path emanating from a radiation source. This may be accomplished either by beam splitting or by beam switching and focusing the reference and sample beams on the detector at a common point. After passing the reference and sample objects the ratio of the sample intensity to the reference intensity is measured.

Since it is impractical to provide materials having identical optical characteristics at all wave lengths the time shared system is preferred. This system becomes even more advantageous when common optical elements are used in both the reference and sample beam paths.

In the spectrophotometer according to the present invention the foregoing has been taken into account by causing a light beam to alternate between two luminous paths by means of one and the same oscillating mirror.

In microscopy it is of importance to utilize the full capacity of a microscope, i.e. to operate with the full aperture to achieve maximal resolution in order to suppress artefacts and erroneous information.

When developing the invention this has been taken into consideration, and no disturbance of the ordinary function of the microscope has been allowed to occur.

Before describing the present invention more in detail it will be necessary further to explain the measuring method applied.

The functional characteristic of a photomultiplier may be expressed by the equation:

$$I = SLkV^{an} \qquad (1)$$

in which $I$=the photo anode current, $S$=the photo cathode sensitivity (amp/lumen), which is constant at a given wave length, $L$=the luminous intensity measured in lumen, $k$=the number of steps, $V$=the dynode voltage per step, $a$=a constant depending on the light sensitive layer, and $n$=the number of steps minus one or $k-1$.

This characteristic shows that a photomultiplier may be utilized in a manner advantageous for luminous absorption analysis. As mentioned hereinbefore it is preferable in such an analysis to measure the relation between two intensity values in such a manner that a function $$\log \frac{L_o}{L} = E$$

will be obtained as the final value of the measurement.

If in Equation 1, the values of $L_o$ and $L$ are inserted, we get from the two equations thus obtained that $$\frac{IL_o}{I_oL} = \left(\frac{V}{V_o}\right)^{an}$$

and translated into logarithms $$\log \frac{I}{I_o} + \log \frac{L_o}{L} = an \log \frac{V}{V_o}$$

If $I/I_o$ can be maintained at a constant value equal to 1 in the measuring or test circuit, we have $$\log L_o/L = an(\log V - \log V_o)$$

which proves that, if the dynode voltage V is translated into logarithms, for example by a function converter in such a manner that $\log V = be$, where $b$ is a constant and $e$ a voltage, then $$\log L_o/L = an(\log V - \log V_o) = b(e - e_o) = bU = E$$

This implies that, if the respective values of the dynode voltage are translated into logarithms and the resulting difference is then tapped, we achieve a final voltage with a measuring value directly proportional to the absorbance E, i.e.

$$\log L_o/L = bU = E$$

In a practical application of the conditions disclosed hereinbefore a D.C. amplification is employed having a high degree of feed back to the anode loading of the photomultiplier in order to keep the photo anode current I constant within acceptable values. By this method a high fidelity and good pulse shape is obtained, which is of importance for the conversion of the function and the final measurement, since the measurements in this case have to be made on the flat portion of the peak values of the voltage pulses.

By keeping the photo anode current I constant according to the invention, the dynode voltage V is allowed to vary as a function of the luminous intensity variation on to the cathode of the photomultiplier. Such intensity variations will be obtained by means of an oscillating mirror system allowing for the scanning of two alternating points within the microscope sample during definite time intervals. If the sample at the respective scanning points is modulating the luminous intensity to a different extent the result will be a variation of the dynode voltage. After translating the dynode voltage into logarithms in a function converter the said voltage variation is derived and then rectified and registered as the final value of measurement.

Figure 2:
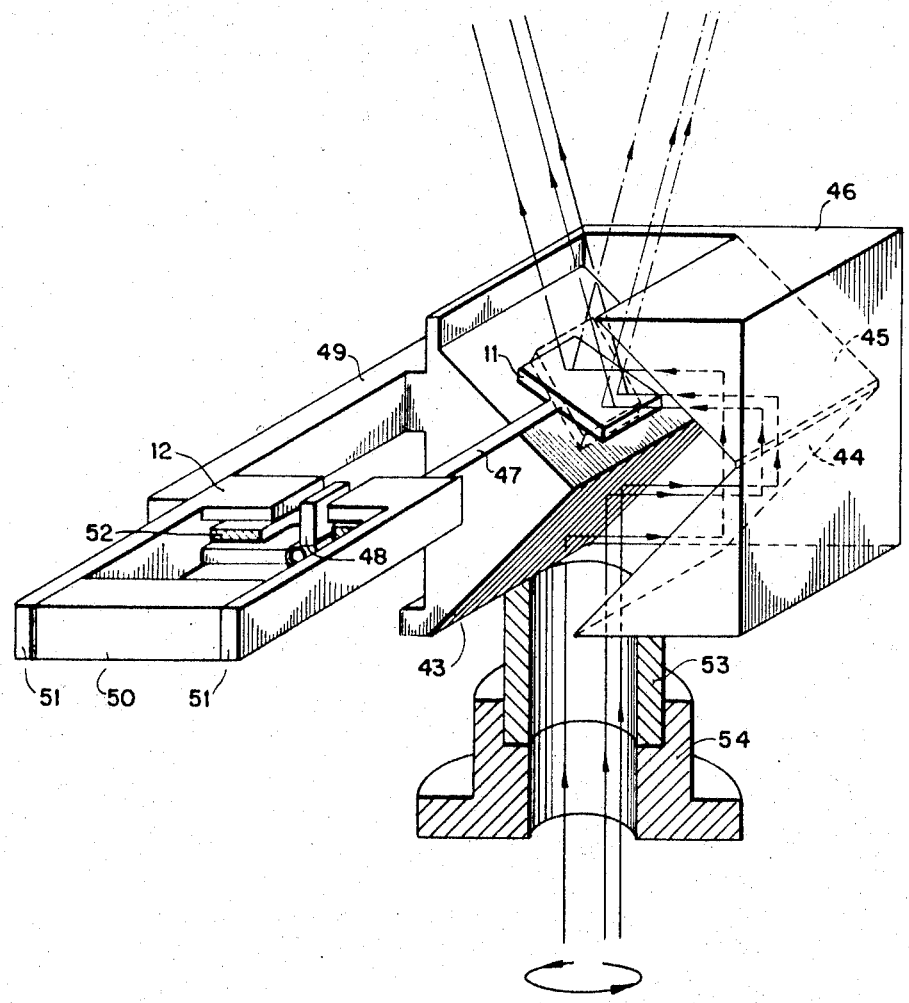

The invention will be described more in detail hereinafter with reference to the accompanying drawings, in which FIG. 1 is a diagrammatical view of an exemplary preferred embodiment of the invention, and FIG. 2 is a perspective view of one preferred embodiment of the luminous ray directing unit on a larger scale.

The arrangement illustrated and its functions are more readily described commencing with the optical end of the instrument (FIG. 1).

A luminous source 1 is reproduced through a collimator 2 at the entrance slit 3 of a monochromator, which after dispersion of the light again reproduces the luminous source in the exit slit 5. The luminous wave length reproduced in the exit slit is selected by a corresponding setting of the dispersion element 4 of the monochromator. The exit slit image is reproduced by means of an optical system 6 in the entrance aperture of the microscope condenser 10 over a stationary mirror 8 with 90 degrees deviation and a mirror system 9. The optical system 6 also acts as an element of adaptability for the exit aperture of the monochromator and the entrance aperture of the microscope condenser, so that the optimal radiant energy is utilized. The mirror system 9 comprises four totally reflecting mutually parallel mirrors, one mirror 11 of which can be caused by means of an electromagnetic system 12 as a driving source momentarily to take two different positions resulting in a deviation from the parallelism. The result of this deviation is that the beam of rays emerging from the mirror system 9 will be reflected with a small angular difference in two different directions determined by the end positions of the oscillating mirror 11, thus providing a time sharing of the radiant energy.

The mirror system 9 and the driving source 12 firmly attached thereto can be revolved about an axis of rotation coinciding with the optic axis of the microscope. The common plane extending through the two beams of rays, will in this case take different directions allowing for the free choice of measuring points in the microscope sample. This will be described more in detail hereinafter.

A variable diaphragm 7 is reproduced by the condenser of the microscope in its object plane 13. A sufficiently small aperture of the diaphragm 7 and a sufficiently large amplitude of the oscillating mirror 11 will give the visual impression of two small illuminated areas in the object plane. In these areas the reference and the sample, respectively, are placed.

This technique of reproduction and illumination is advantageous for various reasons. The Schwarzwald-Villiger-effect (diffusion by reflection in the lens surfaces, etc.) is practically eliminated. As the two areas in the object plane are illuminated by identically the same luminous source, any uneven distribution of the intensity in the beam will be of no importance. The two areas to be measured are identically equal in size and their size may be chosen within certain limits. The oscillating mirror 11 and the fixed mirrors in mirror system 9 are common to the two luminous paths so that the reflection losses are identical. The luminous source reproduced in the entrance aperture of the condenser 10 will, by the influence of the oscillating mirror 11, present a double image, but since the oscillation amplitude of the mirror is small, the two images will in practice approximately overlap. The microscope will hence operate in the ordinary way with regard to its original function.

The sample and the reference are reproduced by the objective 14 in the image plane of the ocular 15. The cathode 17 of the photomultiplier is placed in the exit pupil of the ocular. In this way the two beams or ray will strike the same surface of the photo cathode, since the images of the luminous source overlap in the plane of the exit pupil.

The character of the influence of the luminous intensity and its variation on the light sensitive cathode of the photomultiplier will be in the first place depend on the optical properties of the sample and the mode of operation of the oscillating mirror. If the oscillating mirror is caused to take two momentary end positions ($t_1$ and $t_2$) comprised in a periodical process, the beam of rays will alternately pass through the reference and the samplei, respectively, during the interval the respective end positions are constant. The periodical movements, which the mirror should be caused to perform to make it possible to apply the said method of measurement, thus corresponds to a rectangular wave.

The necessary movement of the mirror 11 is achieved by permitting the mirror to be driven by an electromagnetic system 12 with a high mechanical damping, to which system is supplied a voltage, whose wave shape is that of a rectangular wave. This voltage and wave shape are obtained by applying a sine voltage with a high amplitude to the double constant voltage diode 19 over a condenser 20. From a potentiometer 21 voltage is supplied to the electromagnetic system of a size corresponding to the desired mirror amplitude. With such an arrangement of the circuit the selected mirror amplitude is kept constant due to the stabilising effect of the constant voltage diodes. By maintaining the mirror amplitude constant the disposition of the surfaces to be measured in the object plane remain in a fixed position during the total measuring process.

Thus, the oscillating mirror 11 will influence the light beam in such a manner that after reflection it is thrown in two different but definite directions during two separated but equal time intervals. The luminous intensity will hence during one interval ($t_1$) be modulated by the reference and during the second interval ($t_2$) by the sample.

At the incidence of the light beam on the cathode 17 of the photomultiplier, a primary photo current will be generated by electron emission, which current is proportional to the luminous intensity. If the two objects modulate the luminous intensity to a different extent a pulsating primary photo current will be generated, and if the modulation is equal, i.e., when the intensity from the two objects is the same, a constant primary photo current will be generated.

The primary photo current is amplified by secondary emission in the dynodes 22 and tapped as an anode photo current between the photo anode 23 and the last dynode, which is grounded, over the anode loading impedance 24 of the photomultiplier.

The primary photo current is $I_p = SL$, and the anode photo current is, as stated hereinbefore, $I = SLkV^{an}$. The method of measurement applied maintains the anode photo current (I) at a constant value independent of the variations of the luminous intensity (L). This is achieved by comparing the voltage drop caused by the anode photo current over the impedance 24 with a constant reference voltage generated by a voltage source 25.

By a negative feedback over the dynode chain, so called dynode feedback circuit, the error signal between the reference voltage and that over the photo anode loading can be kept at a sufficiently low value, if the degree of feedback is high. This means that the anode photo current is kept at an acceptable constant value.

A high feedback is obtained by applying the error signal to the input terminal of a D.C. wide-band amplifier 26 whose output voltage is applied to the grid of a control tube 27 connected in series with voltage divider 28 determining the voltage supply of the dynodes. The control tube acts as a variable resistance in series with the voltage divider, and the circuit is supplied with energy from the voltage source 29. The control voltage applied to the grid of the control tube influences the voltage over the dynodes, and hence the amplification in the photomultiplir in such a manner that the anode photo current voltage drop over the photo anode loading tends to approach the reference voltage of the voltage source 25.

By varying the voltage applied to the dynodes the amplification of the photomultiplier will be changed. The degree of feedback will thus be the product of the amplification (A) in the amplifier 26 and the change in the amplification of the photomultiplier $$\left(R\frac{dI}{dV}\right)$$

where R stands for the photo anode loading. If the amplification (A) is sufficiently high, the anode photo current will achieve approximately a constant value. The variation of the amplification $$\left(R\frac{dI}{dV}\right)$$

will be relatively constant within the dynode voltage range utilized during the measurements. This means that great stability is maintained in the circuit even for large variations of the luminous intensity. Thus, the voltage value over the voltage divider 28 is determined only by the luminous intensity incident on the photo cathode.

In order to obtain high sensitivity and good linearity the voltage pulses over the dynode chain should have the shape of a rectangular wave, and the measurement of their amplitude should be performed during the time interval when the peak value is constant. The oscillating mirror 11 is driven at any desired frequency, which, for example, may be 50 cycles per second. In practice it has been proven that the band width should not go below about 1000 cycles in order to obtain a good pulse shape, since the input capacitance of the amplifier 26 determines the magnitude of the photo anode impedance 24 and the sensitivity. If these conditions are considered, the logarithm of the voltage over the voltage divider 28 will be proportional to the intensity incident on the photo cathode during the time intervals $t_1$ and $t_2$. If two luminous intensities which, due to the influence of the reference or sample, respectively, have the values $L_o$ or $L$, respectively, incide on the photo cathode during the intervals $t_1$ and $t_2$, respectively, their relation will provide a voltage over the voltage divider 28, which may be expressed by the equation $$\log \frac{L_{o_{t_1}}}{L_{t_2}} = an\left(\log V_{t_2} - \log V_{o_{t_1}}\right)$$

As stated hereinbefore the measuring value of $$\left(\log V_{t_2} - \log V_{o_{t_1}}\right)$$

is the information desired.

The necessary translation into logarithms of the momentary dynode voltage value takes place in a function converter 18 with logarithmic response, connected so that one of the input terminals is connected to the minus end of the voltage divider, and the second input terminal is grounded. The output voltage of the function converter is proportional to the logarithmic value of the dynode voltage $e_{ut} = b \log V$. By removing the direct voltage component with the condenser 30 the alternating voltage component is obtained between the input terminals of the transformer 31. The peak value of the supplied alternating voltage is proportional to the difference of $$\left(\log V_{t_2} - \log V_{o_{t_1}}\right)$$

The secondary side of the transformer, which has a grounded centre tap, has its two winding branches 35, 36 connected to the two stationary contacts of a switch 32. The movable central contact of the switch is connected to a filter consisting of a condenser 33 connected in parallel with the resistance 34. The switch and the secondary side of the transformer will act as a two-way rectifier, since the voltages on the two transformer branches are 180 degree out of phase.

The central contact of the switch is synchronised with the movement of the oscillating mirror 11, so that with the mirror in its end position $t_1$, the central contact will be in its position $t_1$ and connect the transformer branch 35 with the condenser 33, and with the mirror in its ends position $t_2$ the central contact will connect the transformer branch 36 with the condenser.

In order to avoid erroneous information produced during the displacement of the oscillating mirror between its end positions, the duty time of the switch 32 must not be of longer duration than that corresponding to the constant peak values of the voltage pulses.

Between the output terminals a measuring device 38 is connected, so that a continuous graphic registration of the values of measurement can be obtained as a function of the luminous frequencies. The alteration of the luminous frequency is caused by permitting the displacement of the dispersion element 4 in the monochromator be controlled synchronously by the arrangement of the measuring device for feeding the registering paper. The highest rate of change of the luminous frequency is determined by the frequency with which the oscillating mirror is operating. The scanning speed should not be at such a high value that a derivative measurement of the selectivity of the luminous source will occur. This means that approximately the same luminous frequency will strike the mirror in its two end positions. As a rule, the scanning speed of the luminous frequency will be determined by the time constant of the condenser 33 and the resistance 34, owing to the low luminous intensities passing through the microscopic surfaces to be measured.

The voltage shape at various points of the circuit is shown diagrammatically in FIG. 1. If the light beam when passing through the sample is reduced to an intensity value below that intensity which has passed through the reference, the voltage over the photomultiplier anode loading tends to fall. The grid voltage of the control tube will then rise, which results in the voltage over the dynodes increasing in a negative direction shown in $t_2$ 39; and in this case the amplification in the photomultiplier will increase, and thus the anode photo current, so that the voltage value over the anode loading rises to the reference voltage value. As long as the mirror 11 is in its end position $t_2$ and the luminous intensity is thus constant, the voltage over the dynode chain, after reaching its peak value, will remain constant. The total direct voltage is continuously applied to the function converter and the voltage shape out of the same is shown at 40, where the peak value during the interval $t_2$ is proportional to the logarithmic peak value $t_2$ over the dynode chain.

During the interval $t_1$, when the mirror 11 is directing the light beam through the reference, it is assumed that the luminous intensity is higher, so that the voltage over the photomultiplier anode loading tends to increase. The control grid voltage in the control tube is reduced therefore, the voltage over the dynode chain drops in a positive direction and the amplification in the photomultiplier is reduced until the voltage over the photomultiplier anode loading is set at the value of the reference voltage. After the regulating conditions of the circuit have become constant, a constant direct voltage value over the dynode chain is obtained, as illusrated at $t_1$ 39.

The shape of the voltage pulses after removal of the direct voltage component is shown at 41.

At the secondary side of the transformer the voltage on the two windings will be 180 degrees out of phase, since the secondary end has a grounded centre tap. The pulse shape and phase displacement is illustrated by the wave graphs 35 and 36. If the phase position of the switch 32 is selected so that the positive cycle of the respective branch voltages is rectified, a direct voltage which, after smoothing in the filter device 33, 34, has the shape shown at 42 is obtained.

With reference to FIG. 2 the structure and effect of the mirror system on the light rays will now be described.

The light ray entering the mirror 8 (in FIG. 1) from beneath is reflected by the mirror 43 to the mirror 44 with 90° deviation. These two mirrors are mutually parallel. The mirror 44 reflects the ray at a 90° angle to the mirror 45, from where the ray is reflected to the oscillating mirror 11.

When the oscillating mirror takes its position of rest it is parallel to the plane of the mirror 45 and adjusted at such a distance from the same that it reflects the emerging ray in a direction totally coinciding with that of the incident ray to the mirror system. That is to say that the mirror system has no influence on the direction of the original ray. The mirrors 43, 44 and 45 are firmly attached to a holder 46.

The oscillating mirror 11 is fixed to a shaft 47 connected to the armature 48 of an electromagnetic system 12. This system is attached to the holder 46 by means of an arm 49. The electromagnetic system comprises a permanent magnet 50, the magnetically conducting metal portions 51 and a winding 52.

If an alternating voltage is applied to the winding the armature will describe a reciprocating movement with its axis of rotation coinciding with that of the mirror 11. The mirror will then deviate the emerging light ray in a plane (the plane of oscillation) perpendicular to the axis of rotation. The size of the angular deviation of the ray from the optic axis is determined by the voltage applied to the winding.

The holder 46 is firmly mounted on a shaft 53 having a central bore and resting in a groove in base 54 likewise provided with a bore. The centres of the bores coincide with the optic axis.

The shaft with the bore and hence the entire mirror system can revolve in relation to the stationary base 54, so that the axis of rotation coincides with the optic axis. By turning the mirror system the plane of oscillation of the ray may thus be set in any optional direction in relation to the base.

Thus, the mirror 11 deviates the ray to its two end positions $t_1$ and $t_2$ (FIG. 1), with the images of the diaphragm 7 projected by the condenser 10 falling in the plane of the reference and sample 13. By turning the plane of oscillation two optional measuring surfaces 13 may be selected within the circular dash-lines, as shown beside the path of the rays.

By altering the mirror amplitude and turning the plane of oscillation any two optional measuring surfaces may hence be chosen within the range of visibility of the microscope.

While the invention has been described by reference to a single preferred embodiment, various modifications and variations are possible and will be apparent to those skilled in the art without departing from the scope of the appended claims.

What is claimed is:

1. A spectrophotometer for measuring the absorbance of a microscopic sample comprising:
    a source of radiation,
    monochromator means for dispersing radiation from said source,
    a microscope,
    radiation reflecting means for focusing said dispersed radiation along the optical axis of said microscope,
    beam switching means positioned to receive said focused dispersed radiation and providing alternate distinct areas of llumination in the object plane of said microscope thereby providing alternate reference and sample beams in said microscope,
    said microscope including means for focusing radiation in said reference and sample beams at a common point and means for measuring the relative intensity of said reference and sample beams,
    said beam switching means including a reflector and means for oscillating said reflector, said means for oscillating said reflector including means for varying the magnitude of oscillation whereby the distance between said alternate distinct areas may be varied.

2. A spectrophotometer according to claim 1 wherein said means for oscillating said reflector comprises an oscillating magnet system responsive to a rectangular wave voltage, and said means for varying the magnitude of oscillation comprises an adjustable source of rectangular wave voltage adjustable as to its amplitude.

3. A spectrophotometer according to claim 2, wherein said source of rectangular wave voltage comprises a double constant voltage diode connected in parallel with said magnet system and means applying a sine voltage to said diode.

4. A spectrophotometer for measuring the absorbance of a microscopic sample comprising:
    a microscope,
    a diaphragm having a variable aperture therein,
    means for dispersing radiation from a source and passing said dispersed radiation through said aperture and along the optical axis of said microscope, said means including means providing first and second beamed paths at the entrance aperture of said microscope thereby to illuminate two separate areas in the object plane of said microscope, the size of said areas being determined by the size of said aperture,
    said microscope including means for focusing said first and second beams at a common point and means for measuring the relative intensities of said two beams, and
    means for adjustably controlling said means providing first and second beam paths whereby the location of said illuminated areas in said object plane may be varied.

5. A spectrophotometer for measuring the absorbance of a microscopic sample comprising: a microscope, means for dispersing radiation from a source and passing said dispersed radiation from a source, means focusing said dispersed radiation along the optical axis of said microscope, means providing first and second radiation beam paths at the entrance aperture of said microscope thereby to illuminate first and second areas in the object plane of said microscope, said last named means being rotatable about the optical axis of said microscope whereby said illuminated first and second areas may be selected by rotation of said last named means, said microscope including means for focusing said first and second radiation beams at a common point and means for measuring the relative intensities of said two beams.

6. A spectrophotometer for measuring the absorbance of a microscopic sample comprising: a microscope, means for dispersing radiation from a source, first reflective means for directing said dispersed radiation along the optical axis of said microscope, second reflective means positioned to receive said radiation and direct the received radiation along a path parallel to said optical axis, third reflective means positioned in said path for directing said radiation perpendicular to said optical axis, fourth reflective means positioned to receive radiation from said third reflective means and redirect said radiation along sad optical axis, means oscillating said fourth reflective means thereby providing alternate reference and sample beams at the entrance aperture of said microscope whereby separate first and second areas in the object plane of said microscope are alternately illuminated, said microscope including means for focusing said reference and sample beams at a common point and means for measuring the relative intensities of the said reference and sample beams.

7. A spectrophotometer for measuring the absorbance of a microscopic sample comprising: a microscope, means for dispersing radiation from a source and directing said dispersed radiation along the optical axis of said microscope, first reflective means positioned to receive said radiation and redirect said radiation along a path parallel to said optical axis, second reflective means positioned in said parallel path to direct said radiation perpendicular to said optical axis, third reflective means positioned to receive radiation from said second reflective means and redirect said radiation along said optical axis, means oscillating said third reflective means thereby providing alternate reference and sample beams at the entrance aperture of said microscope whereby separate first and second areas in the object plane of said microscope are alternately illuminated, said first, second and third reflective means being rotatable about the optical axis of said microscope whereby the illuminated areas in said object plane may be selected, said microscope including means for focusing said reference and sample beams at a common point and means for measuring the relative intensities of said two beams.

8. A spectrophotometer for measuring the absorbance of a microscopic sample comprising:
a microscope,
means for dispersing radiation from a source and passing said dispersed radiation along the optical axis of said microscope, said means including means providing first and second beam paths at the entrance aperture of said microscope thereby to illuminate two separate areas in the object plane of said microscope,
said microscope including means for focusing said first and second beams at a common point and means for measuring the relative intensities of said two beams,
said measuring means including a photomultiplier tube having the photosensitive cathode thereof positioned at said common point to receive radiation from said first and second beams and producing an electrical signal output that is a function of the incident radiation,
means connected to said photomultiplier to sense the anode current,
feedback means including means for varying the dynode voltages of said photomultiplier,
said feedback means being connected to said sensing means and controlling said dynode voltages to maintain said anode current substantially constant,
logarithmic conversion means connected to the dynodes of the photomultiplier to provide an output signal that is a logarithmic function of the dynode voltage, and
means connected to said logarithmic conversion means for providing an output that is a function of the amplitude of the alternating component output of said logarithmic conversion means whereby said last named output is proportional to the logarithm of the ratio of the intensity of said first beam to the intensity of said second beam.

9. In a spectrophotometer, the combination comprising:
a source of radiation;
a microscope having lens means for receiving a sample and a reference in an object plane thereof;
reflector means;
means for directing radiation from said source onto said reflector means;
means for oscillating said reflector means between first and second positions whereby said radiation is alternately reflected along first and second paths;
means positioning said reflector means whereby radiation reflected along said first and second path passes through said lens system and said object plane; and,
a radiation sensitive means positioned to receive radiation that has passed through said object plane along either of said paths;
said means for oscillating said reflector means including means for varying the magnitude of oscillation of said reflector whereby the distance between said paths at said object plane is varied.

10. A spectrophotometer according to claim 9 wherein said source of radiation includes a diaphragm disposed in such a manner that it is reproduced in the object plane of said lens system and forms a limited surface of illumination, which by means of the oscillating reflector means may be moved between a reference position and a measuring position.

11. In a spectrophotometer, the combination comprising:
a source of radiation;
a microscope having lens means for receiving a sample and a reference in an object plane thereof;
reflector means;
means for directing radiation from said source onto said reflector means;
means for oscillating said reflector means between first and second positions whereby said radiation is alternately reflected along first and second paths;
means positioning said reflector means whereby radiaiton reflected along said first and second paths passes through said lens system and said object plane; and
radiation sensitive means positioned to receive radiation that has passed through said object plane along either of said paths;
said means positioning said reflector means including means for rotating said reflector means to thereby change its plane of oscillation.

12. The combination as claimed in claim 11 and further comprising means responsive to said radiation sensitive means for determining the relative intensities of the radiation received along said paths.

13. The combination as claimed in claim 12 wherein said means for determining said relative intensities includes logarithmic conversion means and indicating means responsive to said logarithmic conversion means.

14. A spectrophotometer for direct measurement of extinction comprising:
means for alternately producing reference and sample beams during first and second intervals;
a photomultiplier tube responsive to said reference and sample beams and having dynodes and an anode;
means for sensing anode current;
a reference source;
comparing means responsive to said sensing means and said reference source for producing a feedback signal;
means for applying said feedback signal to said dynodes whereby said dynode voltages vary during said first and second intervals if the intensities of said reference and sample beams are different, said anode current remaining constant; and
means responsive to said dynode voltages for indicating the relative intensities of said reference and sample beams.

15. A spectrophotometer as claimed in claim 14 wherein said means responsive to said dynode voltages includes a logarithmic conversion circuit.

16. A spectrophotometer as claimed in claim 15 wherein said indicating means further comprises an alternating rectifier responsive to said logarithmic conversion circuit;
said means for alternately producing reference and sample beams comprising a reflector and means for oscillating said reflector; and
means for synchronously controlling said oscillating means and said alternating rectifier.

17. A spectrophotometer as claimed in claim 14 wherein said means for applying said feedback signal comprises:
a voltage divider;
an amplifier connected in series with said voltage divider and responsive to said comparing means; and
means connecting said voltage divider to said dynodes.

18. A spectrophotometer comprising:
means alternately producing reference and sample beams during first and second intervals;
a photomultiplier tube responsive to said beams and having dynodes and an anode; and
a feedback circuit connected to said photomultiplier to maintain a constant current therethrough, said feedback circuit comprising:
a resistor through which anode current passes;
a source of reference voltage;
means comparing the voltage drop across said resistor with said reference voltage;
a regulating circuit responsive to said comparing means for varying the voltages at said dynodes whereby said dynode voltages vary if the intensities of said reference and sample beams vary, said anode current remaining constant; and
means responsive to said dynode voltages for indicating the relative intensities of said beams.

References Cited

UNITED STATES PATENTS

| | | |
|---|---|---|
| 2,503,165 | 4/1950 | Meyer. |
| 2,613,572 | 10/1952 | Mathieu. |
| 2,775,160 | 12/1956 | Foskett et al. |
| 2,868,060 | 1/1959 | Akerman et al. |
| 3,256,769 | 1/1966 | Matthews et al. |

OTHER REFERENCES

Blout et al., A Double Beam Infrared Microspectrometer, December 1955, JOSA, vol. 45, No. 12, pp. 1028–1030.

Highly Sensitive Recording Microspectrophotometer, Chance, B.; Perry, R.; Akerman, L.; and Thorell, B.: The Review of Scientific Instruments, vol. 30, No. 8, August 1959, pp. 735–741.

RONALD L. WIBERT, Primary Examiner

V. P. McGRAW, Assistant Examiner